United States Patent
Kawai (10) Patent No.: US 7,748,814 B2
(45) Date of Patent: Jul. 6, 2010

(54) INK-JET RECORDING APPARATUS

(75) Inventor: Koji Kawai, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 133 days.

(21) Appl. No.: 12/057,196

(22) Filed: Mar. 27, 2008

(65) Prior Publication Data

US 2008/0238975 A1    Oct. 2, 2008

(30) Foreign Application Priority Data

Mar. 29, 2007    (JP)    ............... 2007-089163

(51) Int. Cl.
  *B41J 2/205*    (2006.01)
(52) U.S. Cl. ............................. 347/15; 347/9
(58) Field of Classification Search .............. 347/15
  See application file for complete search history.

(56) References Cited

U.S. PATENT DOCUMENTS

| 5,809,215 | A * | 9/1998 | Heydinger et al. ........... 358/1.9 |
| 6,363,172 | B1 * | 3/2002 | Cheung et al. .............. 382/167 |
| 6,837,571 | B2 * | 1/2005 | Hara .......................... 347/43 |
| 2006/0028500 | A1 | 2/2006 | Sakaida et al. | |
| 2006/0028507 | A1 | 2/2006 | Sakaida et al. | |
| 2006/0050101 | A1 | 3/2006 | Sakaida | |

FOREIGN PATENT DOCUMENTS

| JP | H07-125408 A | 5/1995 |
| JP | H07-149036 A | 6/1995 |
| JP | 2003-220717 A | 8/2003 |
| JP | 2006044113 A | 2/2006 |

OTHER PUBLICATIONS

Japan Patent Office; Notice of Reasons for Rejection in Japanese Patent Application No. 2007-089163 (counterpart to the above-captioned U.S. Patent Application) mailed Mar. 10, 2009.

* cited by examiner

*Primary Examiner*—Matthew Luu
*Assistant Examiner*—Brian J Goldberg
(74) *Attorney, Agent, or Firm*—Baker Botts, LLP.

(57) ABSTRACT

An ink-jet recording apparatus of the present invention records an image on a recording medium by having ink landed on the recording medium. The apparatus includes ink-jet heads, a dot position memory unit, an image data memory unit, a print data generating unit and a head controller. The dot position memory unit stores therein dot positions which include: black dot positions where only ink droplets of black ink are landed and chromatic color dot positions where only ink droplets of chromatic color ink are landed. The head controller causes the ink-jet heads to eject the ink droplets to the dot positions, so that: only the ink droplets of the black ink lands in the black dot positions stored in the dot position memory unit; and only the ink droplets of the chromatic color ink lands in the chromatic color dot positions stored in the dot position memory unit.

4 Claims, 9 Drawing Sheets

INK-JET RECORDING APPARATUS

The present application claims priority from Japanese Patent Application No. 2007-89163, which was filed on Mar. 29, 2007, the disclosure of which is herein incorporated by reference in its entirety.

BACKGROUND OF THE INVENTION

1. Field of the Invention

The present invention relates to an ink-jet recording apparatus for forming an image on a recording medium.

2. Description of Related Art

As an ink-jet printer ejecting ink droplets to a recording medium such as a recording sheet, there is known an ink-jet printer provided with four ink-jet heads from which ink droplets of four colors, for example, cyan, magenta, yellow, and black (CMYK) are ejected onto a recording sheet having transferred with an aid of a transfer structure. Such an ink-jet printer is capable of forming dots of an intended color on the recording medium, by (i) ejecting an appropriate amount of ink droplets from each of the four ink-jet heads, and (ii) mixing the colors on the recording medium. Theoretically, black can be formed by mixing the colors of cyan, magenta, and yellow. However, it is difficult to accurately form black, through such a color mixing method. In view of that, black ink accurately prepared in advance is used when black is needed.

To form a less bright color with the above mentioned ink-jet printer, black ink and a small amount of ink of the other colors (cyan, magenta, yellow) are mixed. However, since the color of the black ink is thicker than the other colors, simply mixing of the small amount of the ink of the other colors into the black ink hardly affects the color of black ink. For this reason, in a low-brightness region of an image to be recorded on a recording medium, it is difficult to express a slight difference of colors, due to a high percentage of the black ink in the region.

SUMMARY OF THE INVENTION

In view of the above problems, it is an object of the present invention to provide an ink-jet recording apparatus whereby differences of colors in a low-brightness region are easily expressed.

With the present invention, there is provided an ink-jet recording apparatus, which records an image on a recording medium by having ink landed on the recording medium, includes: ink-jet heads which eject ink droplets of black and a plurality of chromatic colors on to the recording medium; a dot position memory unit which stores therein dot positions; an image data memory unit which stores therein an image data item of the image; a print data generating unit which generates a print data item based on the image data item stored in the image data memory unit; and a head controller which causes the ink-jet heads to eject ink droplets to the dot positions. The dot positions include: black dot positions where only ink droplets of black ink are landed, and which positions are evenly distributed in at least a part of the image; and chromatic color dot positions where only ink droplets of chromatic color ink are landed. The image data item is stored in the form of dot data items each indicating grayscale values of the black and chromatic colors for the dot positions in the image. The print data item containing dot data items indicating grayscale values of black for the black dot positions, and grayscale values of the plurality of chromatic colors for the chromatic color dot positions. The head controller causes the ink-jet heads to eject the ink droplets to the dot positions, so that: only the ink droplets of the black ink lands in the black dot positions stored in the dot position memory unit; and only the ink droplets of the chromatic color ink lands in the chromatic color dot positions stored in the dot position memory unit, the ink droplets whose volumes respectively corresponding to the grayscale values associated to the dot positions indicated by the print data item generated by the print data generating unit.

According to the present invention, the black dot positions where only the ink droplets of the black ink are landed are apart from the chromatic color dot positions where the ink droplets of chromatic colors are landed. Thus, it is possible to keep the black ink from dominating a color expressed by the chromatic color dot positions. Thus, color adjustment by the chromatic color positions is possible, and difference of colors in a low-brightness region is easily expressed.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

The following describes a preferable embodiment of the present invention with reference to attached drawings.

Figure 1:
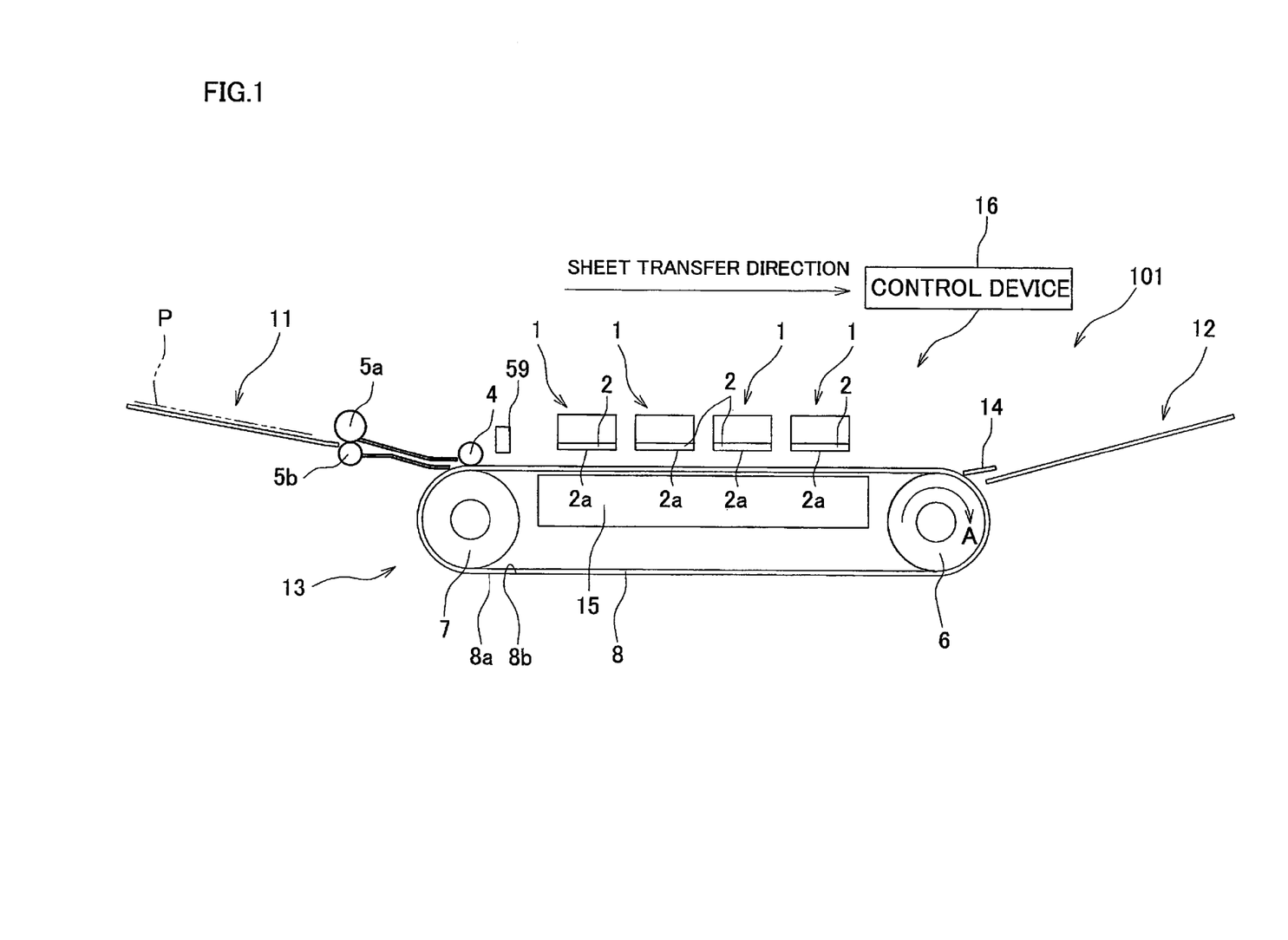
FIG. 1 is an external side view showing an ink-jet printer according to an embodiment of the present invention.

As shown in FIG. 1, an ink-jet printer 101 of the embodiment in accordance with the present invention is a color ink-jet printer having four ink-jet heads 1. Further, the ink-jet printer 101 includes a control device 16 which controls overall operations of the ink-jet printer 101. In this ink-jet printer 101, a sheet feeding unit 11 is provided on the left of the figure, and a sheet delivering unit 12 on the right of the same.

Inside the ink-jet printer 101, formed is a sheet transfer path through which a sheet (recording medium) P is transferred from the sheet feeding unit 11 to the sheet delivering unit 12. On the immediately downstream of the sheet feeding unit 11, disposed are a pair of feeding rollers 5a, 5b. The feeding rollers 5a, 5b transfer the sheet P, interposing the sheet P therebetween. With the pair of feeding rollers 5a, 5b, the sheet P is fed from the sheet feeding unit 11 to the right side of the figure. In an intermediate part of the sheet transfer path, a belt transfer structure 13 is provided. The belt transfer structure 13 includes: two belt rollers 6, 7; an endless transfer belt 8 wound about the both rollers 6, 7; and a platen 15. The platen 15 is disposed in a region surrounded by the transfer belt 8, and is positioned so as to face the ink-jet heads 1. The platen 15 supports the transfer belt 8 so as to keep the region of the transfer belt 8 facing the ink-jet head 1 from bending downward. In a position facing the belt roller 7, a nip roller 4 is disposed. The nip roller 4 holds down the sheet P having been fed from the sheet feeding unit 11 by the feeding rollers 5a and 5b, against an outer surface 8a of the transfer belt 8.

A not-shown transfer motor rotates the belt roller 6 in the direction of an arrow A in the figure, thereby driving the transfer belt 8. Thus, the transfer belt 8 adhesively retains the sheet P, which is held down against the outer surface 8a by the nip roller 4, and transfers the sheet P towards the sheet delivering unit 12.

Along the sheet transfer path, a peeling structure 14 is provided on the immediately downstream of the transfer belt 8.

The peeling structure 14 peels the sheet P adhered onto the outer surface 8a of the transfer belt 8 from the outer surface 8a, and feeds the sheet P to the sheet delivering unit 12 on the right of the figure.

The four ink-jet heads 1 respectively correspond to four colors of ink (magenta, cyan, yellow, black), and all four ink-jet heads 1 are aligned in the transfer direction. In short, this ink-jet printer 101 is a line printer. Each of the four ink-jet heads 1 has a head main body 2 at its lower end. Each head main body 2 has a rectangular parallelepiped shape, which is long in a direction perpendicular to the transfer direction. Further, a bottom surface of the head main body 2 serves as an ink ejection surface 2a facing the outer surface 8a. When the sheet P transferred by the transfer belt 8 successively passes below the four head main bodies 2, the ink droplets of each color are ejected from the ink ejection surface 2a towards the upper surface of the sheet P, i.e., print surface, thereby forming an intended color image on the print surface of the sheet P.

Figure 2:
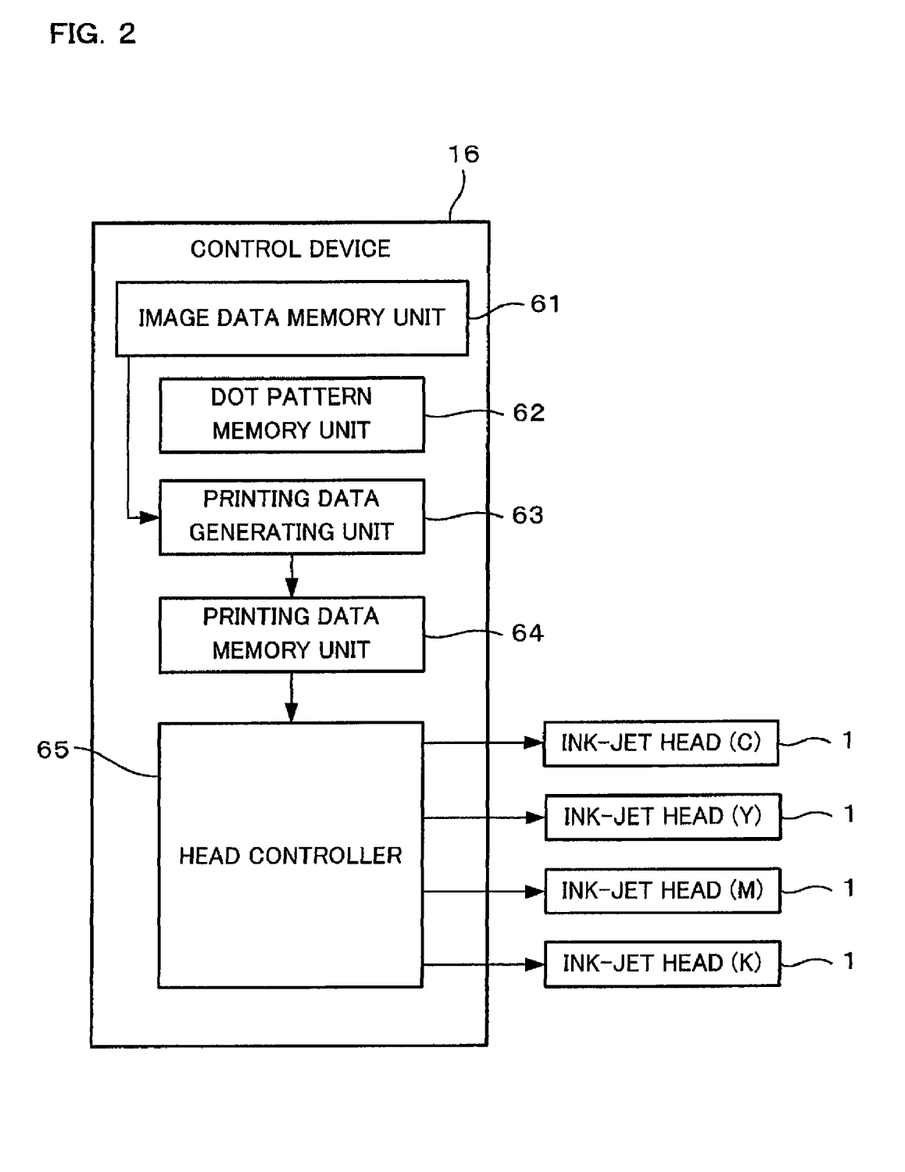
FIG. 2 is a block diagram of a control device shown in FIG. 1.

Next, with reference to FIG. 2, the control device 16 is detailed. As shown in FIG. 2, the control device 16 includes: an image data memory unit 61; a dot-pattern memory unit 62; a printing data generating unit 63; and a printing data memory unit 64; and a head controller 65. The image data memory unit 61 stores therein image data to be printed which is forwarded from a superordinate computer such as a personal computer (PC). For example, the image data is data expressed in the form of CMYK color model. The image data contains therein dot data items each indicating the respective grayscale values of Cyan (C), Magenta (M), Yellow (Y), and Black (K), which range from 0 to 255. The grayscale values of cyan (C), magenta (M), and yellow (Y) correspond to the grayscale values of the chromatic colors in this invention. The grayscale value of black (K) corresponds to the grayscale value of the achromatic color in this invention. Note that, in the following explanation, the value indicated by each dot data item in the image data is expressed as $A(x)=(Cx, Mx, Yx, Kx)$. The symbol "x" indicates the position of a dot, and Cx, Mx, Yx, and Kx respectively indicate grayscale values of cyan (C), magenta (M), yellow(Y), and black(K) in the dot position x.

Figure 3:
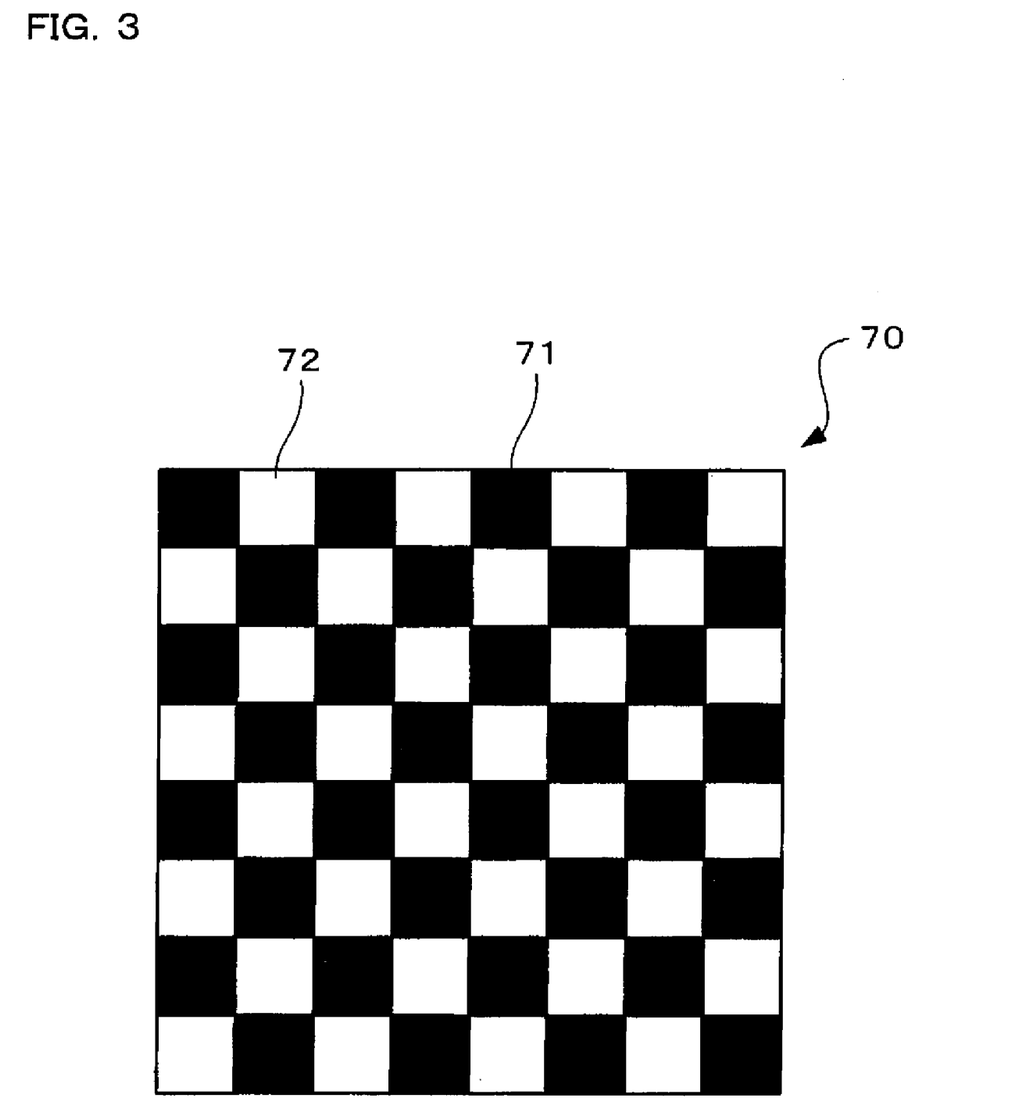
FIG. 3 is a conceptual diagram showing a dot pattern stored in a dot pattern storage.

Next, with reference to FIG. 3, the dot-pattern memory unit 62 is described.

The dot-pattern memory unit 62 stores therein black dot positions 71 and process dot positions 72 (chromatic color dot positions) on the sheet P, in the form of a dot pattern 70. In the present embodiment, the dot positions of an image to be printed on the sheet P are classified into either the black dot positions 71 or the process dot positions 72. Each of the black dot positions 71 is a dot position where only the Black (K) ink droplet is landed. Each of the process dot positions 72, on the other hand, is a dot position where ink droplets of cyan (C), magenta (M), and yellow (Y) are landed. As shown in FIG. 3, the dot pattern 70 is formed by dot positions arranged in a matrix manner (checker-board like manner) in the up/down direction of the figure (first direction) and left/right direction (second direction), so that the dot pattern 70 corresponds to the entire printing data. The black dot positions 71 are respectively arranged adjacent to four sides (top, bottom, left, right) of each process dot position 72. In the present embodiment, the black dot positions 71 are evenly distributed at a ratio of 50% in the dot pattern 70. FIG. 3 provides a simple illustration of 8×8 dot pattern 70.

Based on the dot pattern 70 stored in the dot-pattern memory unit 62, the printing data generating unit 63 shown in FIG. 2 generates printing data from the image data stored in the image data memory unit 61. The printing data contains dot data items each indicating the volume of an ink droplet ejected from the ink-jet head 1 to each dot position of the sheet P (such an ink droplet is hereinafter referred to as an ejection dot). As is the case of the image data, the dot data items of the printing data each indicate a grayscale value of cyan (C), magenta (M), yellow (Y), or black (K), within a range of 0 to 255, according to the CMYK color model. Thus, the printing data is data by which the grayscale values of cyan (C), magenta (M), yellow (Y), and black (K) are expressed.

The ink-jet printer 101 of the present invention is structured so that each of the ink-jet heads 1 of the four colors (cyan (C), magenta (M), yellow (Y), and black (K)) is capable of ejecting ink droplets of two different volumes. Of these ink droplets of two different volumes, a large-volume ink droplet forms, upon landing on the sheet P, a dot whose grayscale value is greater than that of a dot formed by a small-volume ink droplet. In view of this, each of the dot data items are generated to indicate, for each color, one of the following three different grayscale values: a grayscale value corresponding to a large-volume ink droplet; a grayscale value corresponding to a small-volume ink droplet; and zero. Thus, for each of the four colors, there will be the following three kinds of resulting ejection dots: i.e., the ejection dots C(L) (where "L" stands for Large), C(S) (where "S" stands for Small), and C(0) for cyan (C); the ejection dots M(L), M(S), and M(0) for magenta (M); the ejection dots Y(L), Y(S), and Y(0) for yellow (Y); and the ejection dots K(L), K(S), and K(0) for black (K).

Further, when the printing data generating unit 63 generates a dot data item corresponding to a dot position, the printing data generating unit 63 determines whether the dot position is a black dot position 71 or a process dot position 72, based on the dot pattern 70. Then, the printing data generating unit 63 generates different kinds of dot data items, according to whether the dot position is the black dot position 71 or the process dot position. In other words, when the dot position is the black dot position 71, the printing data generating unit 63 generates a corresponding dot data item indicating a non-zero grayscale value for only Black (K), and zero for the rest of the colors cyan (C), magenta (M) and yellow (Y). Further, when the dot position is the process dot position 72, the printing data generating unit 63 generates a corresponding dot data item indicating non-zero grayscale values for cyan (C), magenta (M), and yellow (Y), and zero for black (K). Incidentally, one dot position may have an error between the corresponding dot data item of the image data and the corresponding dot data item of the printing data. In view of this, the printing data generating unit 63 diffuses the error between these dot data items to another dot data item corresponding to an adjacent dot position, as is hereinafter detailed. In the following, the dot data item of printing data is given a symbol B(x)=(C'x, M'x, Y'x, K'x), where: "x" indicates a dot position; and C'x, M'x, Y'x, and K'x are data items respectively indicating the grayscale values of cyan (C), magenta (M), yellow (Y), and black (K) in the dot position x.

The printing data memory unit 64 stores therein the printing data generated by the printing data generating unit 63. The head controller 65 controls the four ink-jet heads 1 so that the ink-jet heads each eject, on to the dot position of the sheet P corresponding to the dot data item B(x), ink droplets whose respective volumes correspond to the grayscale values indicated by the dot data item B(x) of the printing data stored in the printing data memory unit 64.

Figure 4:
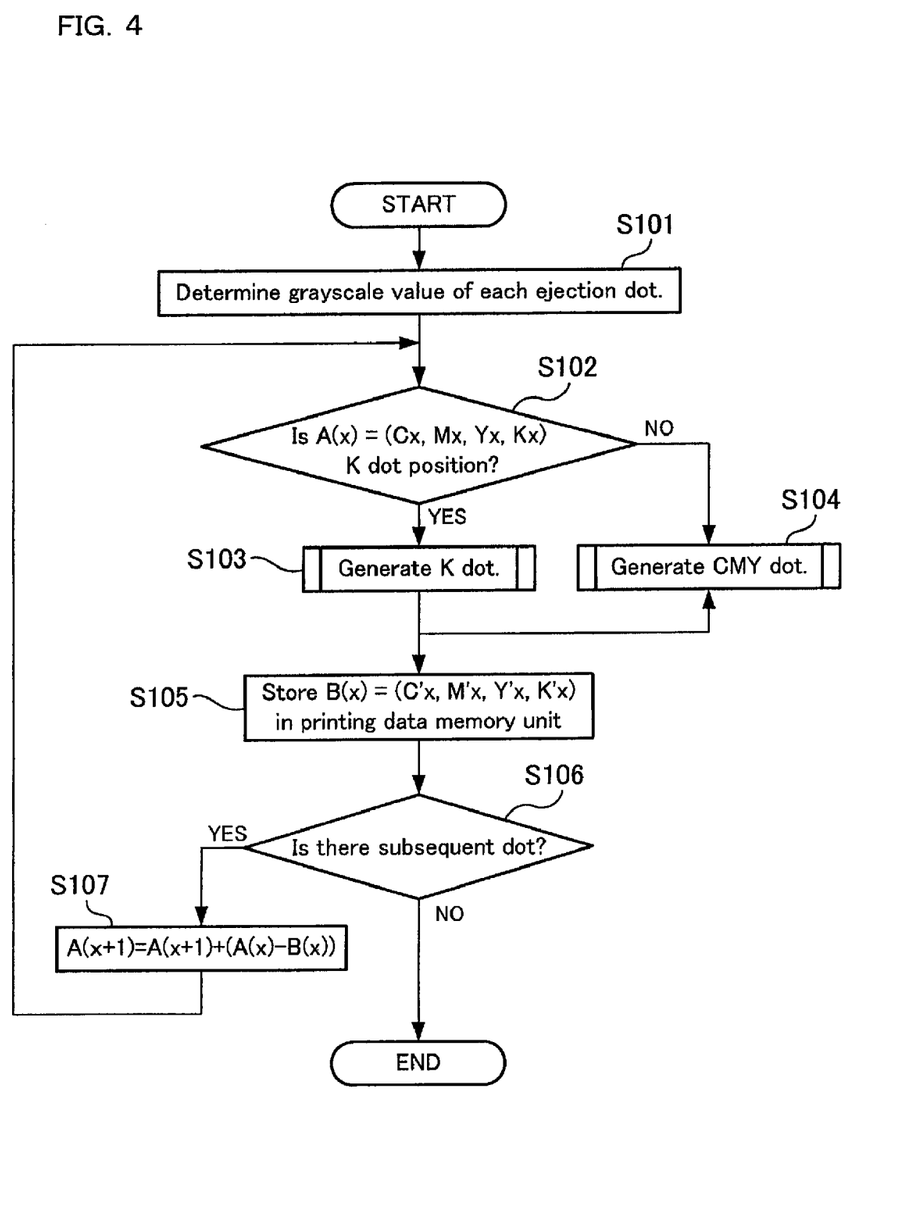
FIG. 4 is a flowchart showing an operation of a printing data generating unit shown in FIG. 2.

The printing data generating unit 63 executes error diffusion when generating the printing data from the image data input. That is, the printing data 63 distributes an error occurred, in a dot position, between the image data and the printing data to a grayscale value of an adjacent dot position through a prescribed distribution method. With reference to FIG. 4, the following describes an operation of the generating unit 63 for generating the printing data while diffusing the error. In the following example, mainly discussed is processing of Black (K) and Yellow (Y). The processing of cyan (C) and magenta (M) is the same as that of yellow (Y), and the explanations therefor is omitted.

As shown in FIG. 4, when a printing operation is started, the printing data generating unit 63 proceeds to the step S101 (hereinafter simply referred to as S101, and the same goes for the other steps), and determines the grayscale values corresponding to the ejection dots based on the image data. Specifically, the printing data generating unit 63 determines the grayscale values corresponding to ejection dots Y(L), Y(S), K(L), and K(S). However, since ejection dot K(L) or K(S) is not formed in the process dot position 72 as hereinabove mentioned, an ejection dot CMY which is for a process black (CMY) synthesized by ink droplets of cyan (C), magenta (M), and yellow (Y), is formed in the process dot position 72 instead of the ejection dot K(L) or K(S). There are also three kinds of ejection dots for the process black (CMY). These three kinds of ejection dots are CMY(L), CMY(S), and CMY(0), and respectively correspond to ejection dots of K(L), K(S), and K(0). Thus, the printing data generating unit 63 further determines the grayscale values of ejection dots CMY (L) and CMY(S). Note that the ejection dot CMY(L) is produced by mixing the ejection dots C(L), M(L), and Y(L). Further, the ejection dot CMY(S) is produced by mixing the ejection dots C(S), M(S), and Y(S). In the present embodiment, the printing data generating unit 63 determines the respective grayscale values of the ejection dots Y(L), Y(S), K(L), K(S), CMY(L), CMY(S) as follows: Y(L)=200, Y(S) =100, K(L)=111, K(S)=56, CMY(L)=89, and CMY(S)=44. Further, the respective grayscale values of the ejection dots C(0), M(0), Y(0), K(0), and CMY(0) are all zero.

The grayscale value of each ejection dot is determined according to an amount of ink ejected from each ink-jet head 1, the ink density ratio and the percentage of the black dot positions 71 in the dot pattern 70. As hereinabove mentioned, the ink-jet head 1 is structured in advance so as to eject ink of different volumes. Thus, the reference grayscale value of each ejection dot is determined according to the ejection amounts.

Further, the grayscale value of the ejection dot K is reduced with an increase in the percentage of the black dot positions 71 in the entire dot positions. For example, when the black dot positions 71 occupy 60% of the entire dot positions, the grayscale value of the ejection dot K is set to one-thirds of the grayscale value set when the percentage of the black dot positions 71 is 20%. Further, the grayscale value of the ejection dot C, M or Y is reduced with an increase in the percentage of the process dot position 72 in the entire dot positions. For example, when the percentage of the process dot positions 72 in the entire dot positions is 10%, the grayscale value of the ejection dot C, M or Y is set to a quadruple of the value set when the percentage of the process dot positions 72 is 40%.

Additionally, the ratio of the grayscale value of the ejection dot K to that of the ejection dot CMY is determined based on a ratio of the density of the black ink to that of the process black ink produced by mixing the ink of cyan, magenta, and yellow. The higher the density of the process black ink relative to the density of the black ink, the smaller the grayscale values of the ejection dots CMY(L) and CMY(S) are set relative to the grayscale values of the ejection dots K(L) and K(S).

In the present embodiment, the percentage of the black dot positions 71 in the entire dot positions equals the percentage of the process dot positions 72 in the entire dot positions: i.e., the respective percentages of the black dot positions 71 and the process dot positions 72 are both 50%. Therefore, only the ratio of the black ink density to the process black ink density is considered. In the present embodiment, it is assumed that the ratio of the black ink density to the process black ink density is 80:100. Accordingly, CMY(L)=89 is determined for K(L)=111, and CMY(S)=44 is determined for K(S)=56. In short, the ratio of K(L) to CMY(L), and the ratio of K(S) to CMY(S) are both approximately 100:80.

Next, the printing data generating unit 63 proceeds to S102 and sequentially acquires, from the leading end of the image data item, each of the dot data items A(x)=(Cx, Mx, Yx, Kx) of the image data in the image data memory unit 61. The printing data generating unit 63 then determines whether each of the acquired dot positions x is a black dot position 71 (K dot position) of the dot pattern 70 in the dot-pattern memory unit 62. If the dot position x is determined as a black dot position 71 (S102: YES), the printing data generating unit 63 proceeds to S103, and generates a dot data item B(x)=(C'x, M'x, Y'x, K'x) of the printing data for the black dot position 71 from the dot data item A(x). Then, the printing data generating unit 63 proceeds to S105. On the other hand, when the dot position x is determined as not a black dot position 71 (i.e., determined as a process dot position 72) (S102: NO), the printing data generating unit 63 proceeds to S104, and generates a dot data item B(x)=(C'x, M'x, Y'x, K'x) of the printing data for the process dot position from the dot data item A(x). Then, the operation proceeds to S105.

In S105, the printing data generating unit 63 causes the printing data memory unit 64 to store the dot data item of the printing data generated in S103 and S104, and then proceeds to S106. In S106, the printing data generating unit 63 determines whether there is a subsequent dot data item A(x+1) of the image data. If there is the subsequent dot data item A(x+1) (S106: YES), the printing data generating unit 63 proceeds to S107. In S107, the printing data generating unit 63 adds, to the grayscale value indicated by the subsequent dot data item A(x+1), a difference between grayscale value indicated by the dot data item A(x) of the image data and that indicated by the dot data item B(x) of the printing data. Thus, A(x+1)=A(x+ 1)+(A(x)−B(x)). That way, errors caused by generating the printing data are diffused (error diffusion process). Then, the printing data generating unit 63 returns to S102, and performs the above described process to the subsequent dot position. On the other hand, if it is determined that there is no subsequent dot data item A(x+1) (i.e., S106:NO), the printing data generating unit 63 completes generating of the printing data, and ends the process of the flowchart of FIG. 4.

Figure 5:
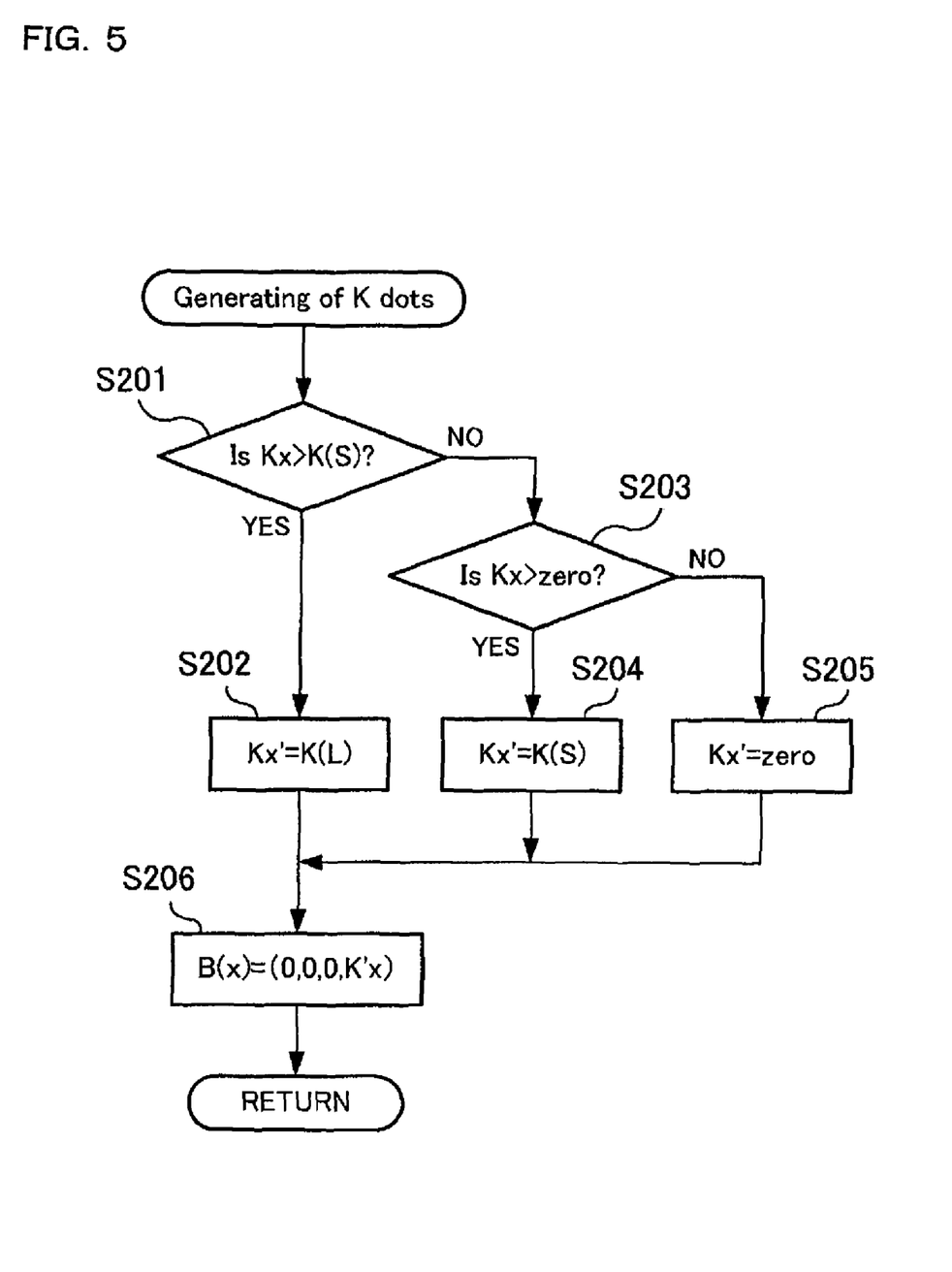
FIG. 5 is a flowchart showing an operation of generating a K-dot shown in FIG. 4.

Next, the following describes with reference to FIG. 5 an operation of generating a K dot shown in FIG. 4. As already mentioned, the operation of generating a K dot is performed in S103 of the flowchart of FIG. 4, and is for generating a dot data item B(x) of the printing data for the black dot position 71. The operation of generating a K dot is started when the dot position x is determined as the black dot position 71. As shown in FIG. 5, when the operation of generating a K dot is started, the printing data generating unit 63 proceeds to S201, and determines whether the grayscale value of Kx indicated by the dot data item A(x)=(Cx, Mx, Yx, Kx) is greater than the grayscale value of the ejection dot K(S). If the grayscale value of the Kx is determined as greater than the grayscale value of the ejection dot K(S) (S201: YES), then the printing data generating unit 63 proceeds to S202, and sets the grayscale value of the K'x of the dot data item B(x)=(C'x, M'x, Y'x, K'x) of the printing data to the grayscale value of the ejection dot K(L). Then, the printing data generating unit 63 proceeds to S206.

On the other hand, if the grayscale value of the Kx is determined as not greater than the grayscale value of the ejection dot K(S) (S201: NO), the printing data generating unit 63 proceeds to S203, and determines whether the grayscale value of Kx is greater than zero.

If the grayscale of the Kx is greater than zero (S203: YES), the printing data generating unit 63 proceeds to S204, and sets the grayscale value of K'x to the grayscale value of the ejection dot K(S). Then, the printing data generating unit 63 proceeds to S206. On the contrary, if the grayscale value of Kx is determined as not greater than zero (S203: NO), then the printing data generating unit 63 proceeds to S205, and sets the grayscale value K'x to zero. Then, the printing data generating unit 63 proceeds to S206.

In S206, the printing data generating unit 63 generates the dot data item B(x)=(0, 0, 0, K'x) with the grayscale value of K'x set in S202, S204 or S205. Then, the printing data generating unit 63 ends the process of the flowchart of FIG. 5, and returns to S105 of the flowchart of FIG. 4. As described, only an ejection dot of Black (K) ink is formed in the black dot position 71, and ejection dots of cyan (C) ink, magenta (M) ink and yellow (Y) ink are not formed in the black dot position 71.

Figure 6:
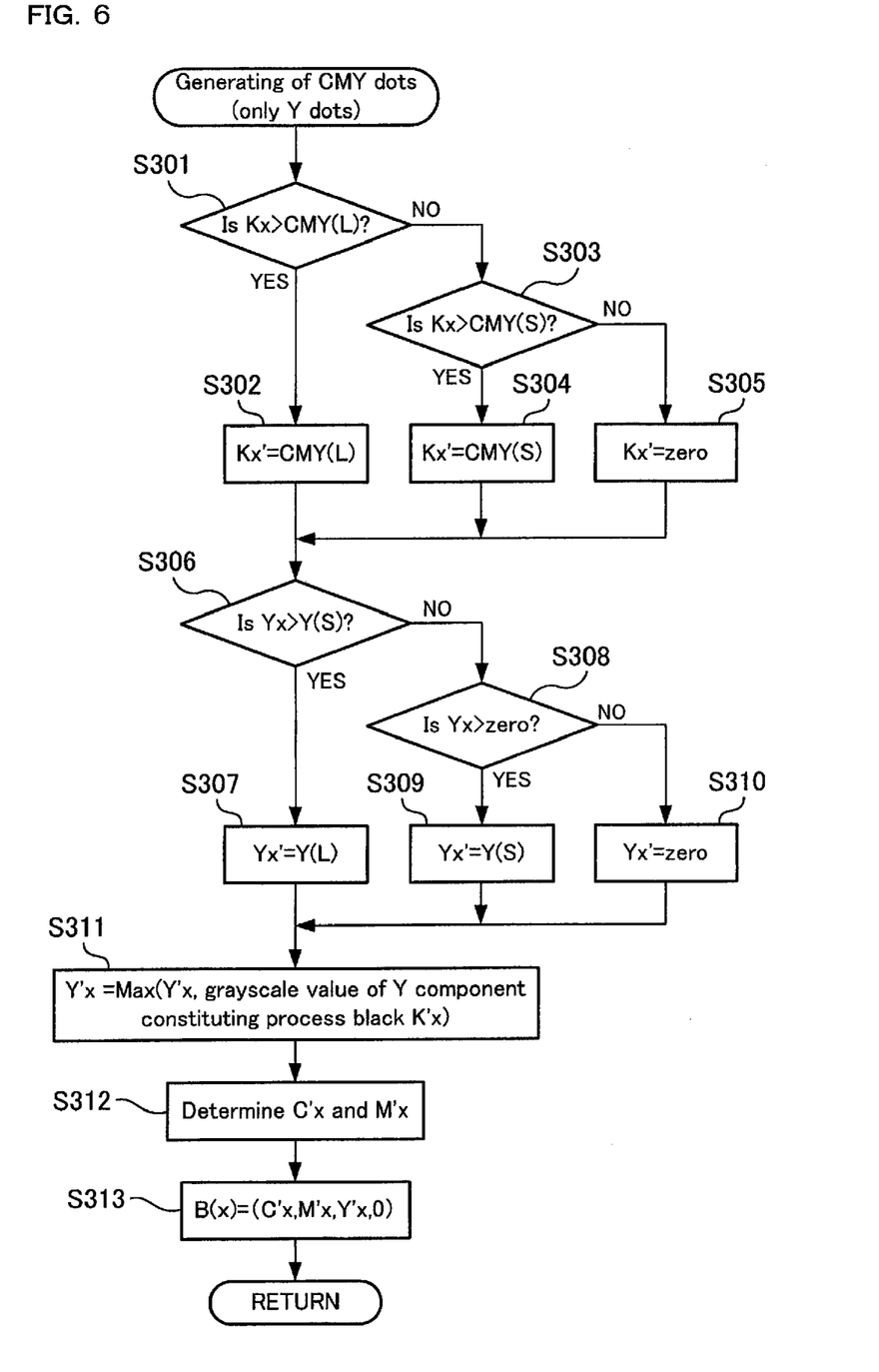
FIG. 6 is a flowchart showing an operation of generating a CMY-dot shown in FIG. 4.

The following describes with reference to FIG. 6 an operation of generating CMY dots shown in FIG. 4. As already mentioned, the operation of generating CMY dots is performed in S104 of the flowchart of FIG. 4, and is for generating a dot data item B(x) of the printing data for the process dot position 72. The operation of generating CMY dot starts when the dot position x is determined as the process dot position 72. As shown in FIG. 6, when the operation of generating CMY dot starts, the printing data generating unit 63 proceeds to S301, and determines whether the grayscale value of Kx in the dot data item A(x)=(Cx, Mx, Yx, Kx) is greater than the grayscale value of the ejection dot CMY(L). If the grayscale value of the Kx is determined as greater than the grayscale value of the ejection dot CMY(L) (S301: YES), then the printing data generating unit 63 proceeds to S302, and sets the grayscale value of the K'x of the dot data item B(x)=(C'x, M'x, Y'x, K'x) in the printing data to the grayscale value of the ejection dot CMY(L). That is, the printing data generating unit 63 converts the grayscale value of black (K) into a grayscale value of process black formed by cyan (C), magenta (M), and yellow (Y). Then, the printing data generating unit 63 proceeds to S306.

On the other hand, if the grayscale value of the Kx is determined as not greater than the grayscale value of the ejection dot CMY(L) (S301: NO), the printing data generating unit 63 proceeds to S303, and determines whether the grayscale value of Kx is greater than the grayscale value of the ejection dot CMY(S). If the grayscale of the Kx is greater than the grayscale value of the ejection dot CMY(S) (S303: YES), the printing data generating unit 63 proceeds to S304, and sets the grayscale value of the K'x to the grayscale value of the ejection dot CMY(S). Then, the printing data generating unit 63 proceeds to S306. On the contrary, if the grayscale value of Kx is determined as not greater than the grayscale value of ejection dot CMY(S) (S303: NO), then the printing data generating unit 63 proceeds to S305, and sets the grayscale value K'x to zero. Then, the printing data generating unit 63 proceeds to S306.

As described, how the grayscale value of the black component of the printing data is determined varies between the black dot position and process dot position. For a black dot position, the grayscale value is determined from the error-diffused grayscale value, in a "bringing-up" manner relative to threshold values. For example, the threshold values in the present embodiment are set so that K(0)=0, K(S)=56, and K(L)=111. When the grayscale value of Kx exceeds the grayscale value of K(S), the grayscale value of K'x is set to the grayscale value of K(L), as shown in FIG. 5. Further, when the grayscale value of Kx exceeds that of K(0), the grayscale value of K'x is set to the grayscale value of K(S). On the other hand, for a process dot position, the grayscale value is determined in a "bringing-down" manner relative to the threshold values. For example, the threshold values in the present embodiment are set so that: CMY(0)=0, CMY(S)=44, and CMY(L)=89. When the grayscale value of Kx exceeds that of CMY(L), the grayscale value of the K'x is set to the grayscale value of CMY(L), as shown in FIG. 6. When the grayscale value of Kx exceeds that of CMY(S), the grayscale value of K'x is set to the grayscale value of CMY(S). Thus, when expressing black of an image, the black ink contributes to generation of black color more than the ink of the synthesized black (process black).

In S306, the printing data generating unit 63 determines whether the grayscale value of Yx in dot data item A(x)=(Cx, Mx, Yx, Kx) is greater than the grayscale value of the ejection dot Y(S). If the grayscale value of Yx is determined as greater than the grayscale value of ejection dot Y(S) (S306:YES), the printing data generating unit 63 proceeds to S307, and sets the grayscale value of Y'x in the dot data item B(x)=(C'x, M'x, Y'x, K'x) of the printing data to the grayscale value of the ejection dot Y(L). Then, the printing data generating unit 63 proceeds to S311.

On the other hand, if the grayscale value of Yx is determined as not greater than the grayscale value of the ejection dot Y(S) (S306:NO), the printing data generating unit 63 proceeds to S308, and determines whether the grayscale value of Yx is greater than zero. If the grayscale value of Yx is determined as greater than zero (S308:YES), then the printing data generating unit 63 proceeds to S309, and sets the grayscale value of Y'x to the grayscale value of the ejection dot Y(S). The printing data generating unit 63 proceeds to S311. On the other hand, if the grayscale value of Yx is determined as not greater than zero (S308:NO), the printing data generating unit 63 proceeds to S310, and sets the grayscale value of Y'x to zero. Then, the printing data generating unit 63 proceeds to S311.

In S311, the printing data generating unit 63 compares (i) a yellow (Y) component in the process black (CMY) corresponding to the grayscale value of K'x determined in S302, S304, or S305 with (ii) a grayscale value of Y'x determined in S307, S309, or S310. Here, the yellow (Y) component in the process black (CMY) corresponding to the grayscale value of K'x means that the grayscale value of the yellow(Y) component corresponds to the grayscale value of the ejection dot yellow (Y) constituting the process black (CMY). For example, when the grayscale value of K'x equals the grayscale value of CMY(S), the grayscale value of the yellow(Y) component in the process black (CMY) corresponding to the grayscale value of K'x equals the grayscale value of the ejection dot Y(S), and therefore is 100. Further, when the grayscale value of K'x equals the grayscale value of CMY(L), the grayscale value of the yellow (Y) component in the process black corresponding to the grayscale K'x equals the grayscale value of the ejection dot Y(L), and therefore is 200. After the comparison, the printing data generating unit 63 sets the grayscale value of Y'x to the larger value. Then, the printing data generating unit 63 proceeds to S312.

Note that, in S311, the error diffusion performed in S107 varies according to how the Y'x is determined in S311. When the grayscale value of K'x determined in any one of S302, S304, and S305 surpasses the grayscale value of Y'x determined in any one of S307, S309, and S310, the grayscale value of Y'x is set to the grayscale value of K'x in S311. In short, the grayscale value of the process black (CMY) is selected in S311. In this case, the error diffusion in S107 is performed as follows. First, an error between the grayscale value of K'x selected in S311 and the grayscale value of Kx of black (k) in the image data is diffused to $K_{x+1}$ in an image data item for a subsequent black dot position. Then, an error between the yellow (Y) component of the process black (CMY) corresponding to the grayscale value of K'x and the grayscale value of Yx of yellow (Y) in the image data item is diffused to the $Y_{x+1}$ in the image data item for the subsequent black dot position.

On the other hand, when the grayscale value of K'x determined in any one of S302, S304, and S305 is not more than the grayscale value of Y'x determined in any one of S307, S309, and S310, the grayscale value of Y'x is set to the grayscale value of Y'x in S311. In short, the grayscale value of yellow (Y) is selected in S311, and the grayscale value of black (K) is ignored. In this case, the error diffusion in S107 is performed as follows. First, an error between the grayscale value of Y'x selected in S311 and the grayscale value of Yx of yellow (Y) in the image data is diffused to $Y_{x+1}$ in the image data item for the subsequent black dot position. Then, the grayscale value of the black (K) component in the image data is added as it is to $K_{x+1}$ in the image data item for the subsequent black dot position.

In S312, the printing data generating unit 63 determines the respective grayscale values of C'x and M'x. The process of determining these grayscale values is the same as that of determining the grayscale value of Y'x through S306 to S311. That is, when the grayscale value of Cx (or Mx) is greater than the grayscale value of C(S) (or M(S)), the grayscale value of C'x (or M'x) is set to the grayscale value of C(L) (or M(L)). Further, when the grayscale value of Cx (or Mx) is greater than zero but not more than the grayscale value of C(S) (or M(S)), the grayscale value of C'x (or M'x) is set to the grayscale value of C(S) (or M(S)). When the grayscale value of Cx (or Mx) is zero, the grayscale value of C'x (or M'x) is set to zero. Further, the grayscale value of the cyan(C) component (or the magenta (M) component) in the process black corresponding to the grayscale value of K'x is compared with the grayscale value of C'x (or M'x), and the greater value is set to the grayscale value of C'x (or M'x). Then, the printing data generating unit 63 proceeds to S313. Thus, in S313, the printing data generating unit 63 generates the dot data item B(x) =(C'x, M'x, Y'x, 0) with the grayscale value of Y'x set in S311, and the grayscale values of C'x and M'x set in S312. Then, the printing data generating unit 63 ends the process of flowchart of FIG. 6, and proceeds to S105 in the flowchart of FIG. 4. As described, in the process dot position 72, formed is an ejection dot of cyan (C) ink, magenta (M) ink, or yellow (Y) ink, but not an ejection dot of black (K) ink.

Figure 7:
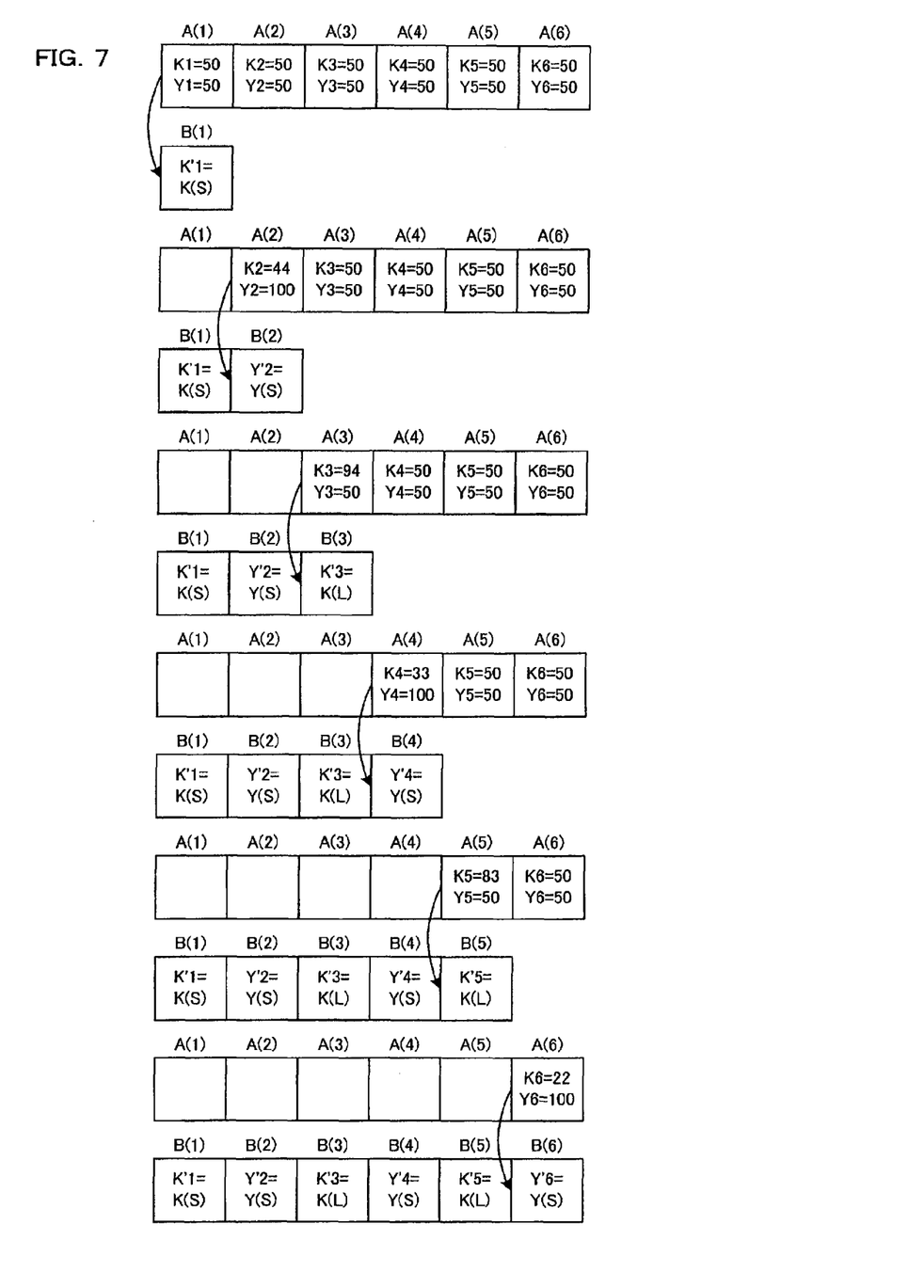
FIG. 7 is a diagram showing a situation where the printing data generating unit of FIG. 2 generates printing data from image data.
Figure 8:
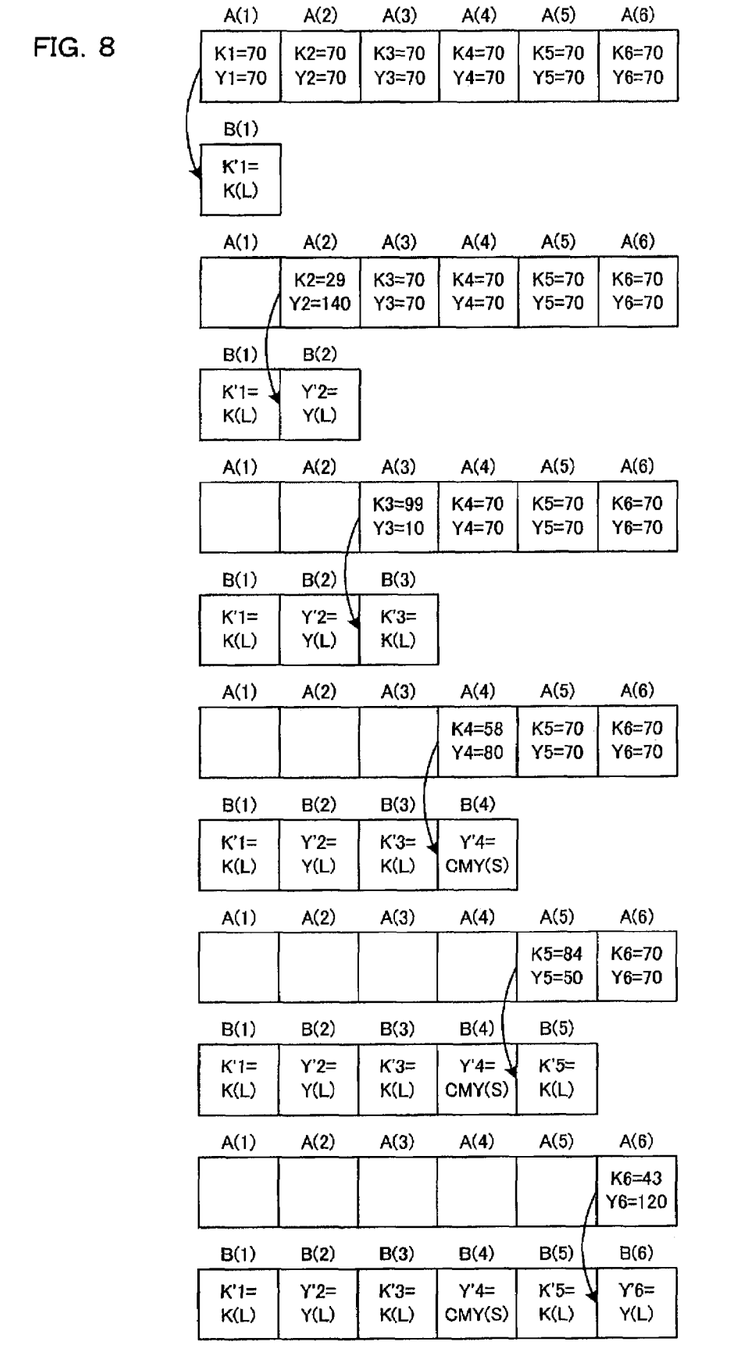
FIG. 8 is a diagram showing a situation where the printing data generating unit of FIG. 2 generates printing data from image data.

Next, with reference to FIG. 7 and FIG. 8, the following describes how the printing data generating unit 63 generates the printing data from the image data, by giving a specific example. Note that, in FIG. 7 and FIG. 8, dot data items B(1), B(3), and B(5) are dot data items of the black dot position 71, and dot data items B(2), B(4), and B(6) are dot data items of the process dot position 72. As is already mentioned, the respective grayscale values of the ejection dots Y(L), Y(S), K(L), K(S), CMY(L), CMY(S) in the present embodiment are determined by the printing data generating unit 63 as follows: Y(L)=200, Y(S)=100, K(L)=111, K(S)=56, CMY(L)=89, and CMY(S)=44.

First, as shown in FIG. 7, the following describes a case where the respective grayscale values of dot data item A(1) to A(6) are set so that the grayscale values of K1 to K6 are all 50, and those of Y1 to Y6 are all 50. When giving an eye on the dot data item A(1), it is understood that dot data item A(1) is a dot data item of the black dot position 71. The grayscale value of K1 (K1=50) is smaller than that of the ejection dot K(S) (K(S)=56) but is greater than zero. Therefore, K'1 which is the grayscale value of B(1) is determined as follows: K'1=ejection dot K(S)=56 (See FIG. 5). At this point, the difference A(1)-B(1) between the grayscale value of A(1) and that of B(1) is added to the grayscale value of A(2) (See FIG. 4: S107). That is, the grayscale values of the black (K) and yellow (Y) of the dot data item A(1) are diffused to the grayscale values of black (K) and yellow (Y) of the dot data item A(2), respectively. The same is done also for cyan (C) and magenta (M). Thus, the grayscale values of K2 and Y2 indicated by the dot data item A(2) are determined as follows: K2=44(=50+50−56), and Y2=100(=50+50).

Further, the dot data item A(2) having been subjected to the error diffusion is a dot data item for the process dot position 72. The grayscale value of K2 (K2=44) is not greater than that of the ejection dot CMY(S) (CMY(S)=44). Therefore, K'2 which is the grayscale value of B(2) is determined as follows: K'2=0 (See FIG. 6:S301 to S305). Further, the grayscale value of Y2 (Y2=100) is not greater than that of the ejection dot Y(S) (Y(S)=100) but is greater than zero. Therefore, Y'2 which is the grayscale value of B(2) is determined as follows: Y'2=ejection dot Y(S)=100 (See FIG. 6: S306 to S310). Further, the grayscale value of Y'2 (Y'2=100) is greater than that of the Y component (Y component=0) of the process black (CMY) corresponding to the grayscale value of K'2 (K'2=0). Therefore, the grayscale value of Y'2 is set so that Y'2=100 (See FIG. 6: S311). At this point, the difference A(2)-B(2) between the grayscale value of A(2) and that of B(2) is added to the grayscale value of A(3). Thus, the grayscale values of K3 and Y3 indicated by the dot data item A(3) are determined as follows: K3=94(=50+44), and Y3=50(50+100−100).

Similarly, the dot data item A(3) having been subjected to the error diffusion is a dot data item for the black dot position 71. The grayscale value of K3 (K3=94) is greater than that of the ejection dot K(S) (K(S)=56). Therefore, K'3 which is the grayscale value of B(3) is determined as follows: K'3=ejection dot K(L)=111(See FIG. 5). At this point, the difference A(3)-B(3) between the grayscale value of A(3) and that of B(3) is added to the grayscale value of A(4). Thus, the grayscale values of K4 and Y4 indicated by the dot data item A(4) are determined as follows: K4=33(=50+94−111), and Y4=100(=50+50).

Further, the dot data item A(4) having been subjected to the error diffusion is a dot data item for the process dot position 72. The grayscale value of K4 (K4=33) is not greater than that of the ejection dot CMY(S) (CMY(S)=44). Therefore, K'4 which is the grayscale value of B(4) is determined as follows: K'4=0 (See FIG. 6: S301 to S305). Further, the grayscale value of Y4 (Y4=100) is not greater than that of the ejection dot Y(S) (Y(S)=100) but is greater than zero. Therefore, Y'4 which is the grayscale value of B(4) is determined as follows: Y'4=ejection dot Y(S)=100 (See FIG. 6: S306 to S310). The grayscale value of Y'4 (Y'4=100) is greater than that of the Y component (Y component=0) of the process black (CMY) corresponding to the grayscale value of K'4 (K'4=0). Therefore, the value of Y'4 is set so that Y'4=100 (See FIG. 6: S311). At this point, the difference A(4)−B(4) between the grayscale value of A(4) and that of B(4) is added to the grayscale value of A(5). Thus, the grayscale values of K5 and Y5 indicated by the dot data item A(5) are determined as follows: K5=83 (=50+33), and Y5=50(=50+100−100).

Further, the dot data item A(5) having been subjected to the error diffusion is a dot data item for the black dot position 71. The grayscale value of K5 (K5=83) is greater than that of the ejection dot K(S) (K(S)=56). Therefore, K'5 which is the grayscale value of B(S) is determined as follows: K'5=ejection dot K(L)=111 (See FIG. 5). At this point, the difference A(5)−B(5) between the grayscale value of A(5) and that of B(5) is added to the grayscale value of A(6). Thus, the grayscale values of K6 and Y6 indicated by the dot data item A(6) are determined as follows: K6=22(=50+83−111), and Y6=100(=50+50).

Lastly, the dot data item A(6) having been subjected to the error diffusion is a dot data item for the process dot position 72. The grayscale value of K6 (K6=22) is not greater than that of the ejection dot CMY(S) (CMY(S)=44). Therefore, K'6 which is the grayscale value of B(6) is determined as follows: K'6=0 (See FIG. 6: S301 to S305). Further, the grayscale value of Y6 (Y6=100) is not greater than that of the ejection dot Y(S) (Y(S)=100) but is greater than zero. Therefore, Y'6 which is the grayscale value of B(6) is determined as follows: Y'6=ejection dot Y(S)=100 (See FIG. 6: S306 to S310). The grayscale value of Y'6 (Y'6=100) is greater than that of the Y component (Y component=0) of the process black (CMY) corresponding to the grayscale values of K'6 (K'6=0). Therefore, the value of Y'6 is set so that Y'6=100 (See FIG. 6: S311). Note that no error diffusion is performed as there is no subsequent dot data item, and therefore the operation of generating the printing data is completed.

Next, the following describes a case where the respective grayscale values of the dot data item A(1) to A(6) are set so that the grayscale values of K1 to K6 are 70, and those of Y1 to Y6 are 70, as shown in FIG. 8. Note that, in FIG. 8, the steps other than those for generating the dot data items B(4) from the dot data item A(4) are substantially the same as those of FIG. 7, and no further explanation is provided here. The dot data item A(4) having been subjected to the error diffusion is a dot data item for the process dot position 72. The grayscale value of the black component (K4=58) of the dot data item A(4) is not greater than that of the ejection dot CMY(L) (CMY(L)=89) but is greater than that of the ejection dot CMY(S) (CMY(S)=44). Therefore, K'4 which is the grayscale value of B(4) is determined as follows: K'4=ejection dot CMY(S)=44 (See FIG. 6: S301 to S305). On the other hand, the grayscale value of yellow (Y) (Y4=80) which is a chromatic component of the dot data item A(4) is not greater than that of the ejection dot Y(S) (Y(S)=100) but is greater than zero. Therefore, Y'4 which is the grayscale value of the chromatic component of B(4) is determined as follows: Y'4=ejection dot Y(S)=100 (See FIG. 6: S306 to S310). Then, the value of the Y component of the process black (CMY) corresponding to the grayscale value of K'4 (K'4=44) equals the grayscale value of the ejection dot Y(S) (Y(S)=100). Accordingly, the Y component of the process black (CMY) corresponding to K'4 and Y'4 are both set to the grayscale value of 100. In the present embodiment, when the grayscale value of the Y component of Y'x and the grayscale value of K'x are equal to each other in S311 of FIG. 6, the value of the Y component of the process black (CMY) is provisionally given the priority. At the end, the grayscale value of Y'4 is set so that Y'4=100.

Note, however, that the error value (error value=−20(=80−100)) in the chromatic component in the process dot position 72 is circumferentially diffused. Thus, in the present embodiment, the dot data item A(5) for the subsequent black dot position 71 is corrected so that: K5=84(=70+58−44) and Y5=50(=70−20). As the result, in this black dot position 71, the grayscale value of K'5 is set as the grayscale value of B(5) so that: K'5=ejection dot K(L)=111.

Here, it is supposed that the grayscale value of Y'4 determined according to the chromatic component Y4 of A(4) is Y(L)=200. In this case, the grayscale value of Y'4 is greater than 100 which is the grayscale value of the Y component of process black K'4 determined according to the black component K4 of A(4). The Y'4 of B(4) therefore is ultimately determined so that: Y(L)=200. Then, the error values are diffused to the subsequent A(5) for each of the black component and chromatic components. As mentioned above, in the process dot position 72, the Y component of the process black (CMY) determined according to the black component of the image data is compared with the grayscale value of yellow (Y) determined according to the chromatic component of the image data. Then, ink ejection for a chromatic color is given the priority only when the value of the latter one is greater than the value of the former one.

Figure 9A:
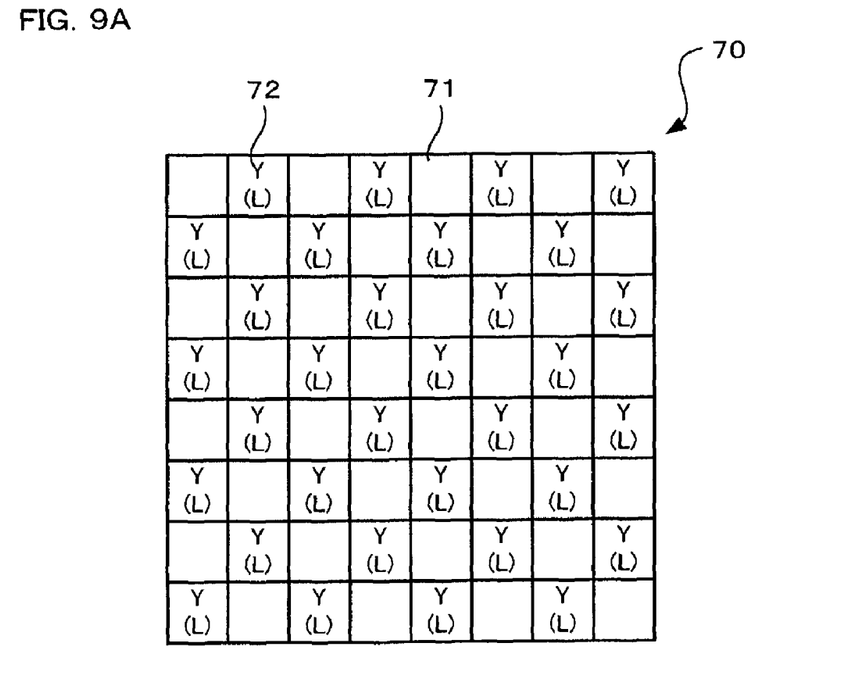
FIG. 9A and FIG. 9B each shows an exemplary printed image of a region corresponding to the dot pattern shown in FIG. 3.
Figure 9B:
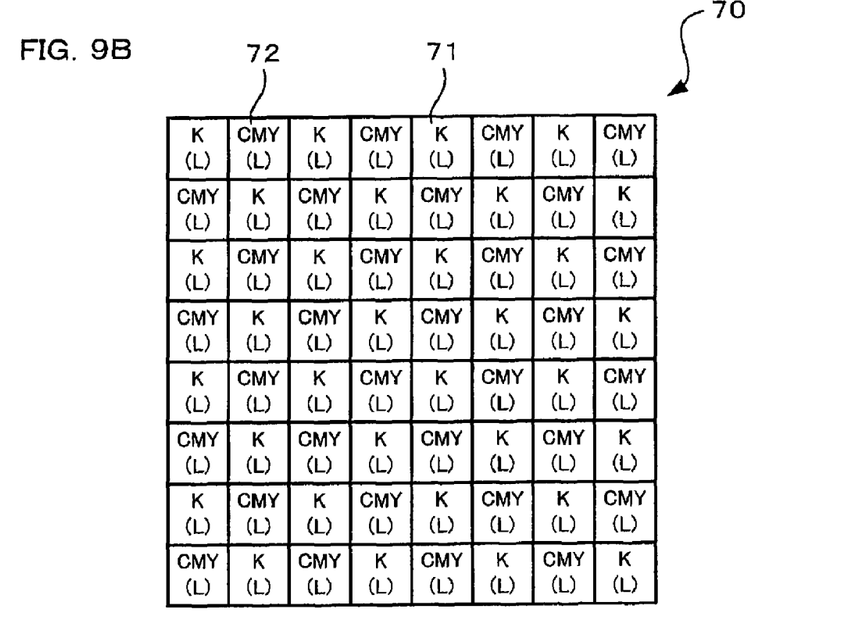

Next, with reference to FIGS. 9A and 9B, the following describes about an expressible color gamut of the present embodiment. FIG. 9A shows an image with the highest brightness and the highest density of yellow(Y). FIG. 9B shows an image with the lowest brightness. As shown in FIG. 9A, to form an image with the highest brightness and the highest density of yellow (Y), no dot is formed in the black dot position 71, and the ejection dot Y(L) is formed in the process dot position 72. Further, as shown in FIG. 9B, to form an image with the lowest brightness, the ejection dot K(L) is formed in the black dot position 71, and the ejection dot CMY(L), formed by the ejection dots C(L), M(L) and Y(L), is formed in the process dot position 72. Thus, black (K) ink does not overlap cyan (C), magenta (M), or yellow (Y) ink in each dot position on the sheet P.

According to the present embodiment hereinabove explained, each black dot position 71 is apart from each process dot position 72. Therefore, a color expressed in the process dot position 72 is not dominated by black (K) ink. Thus, as an intended process color in the process dot position 72 is formed with cyan (C), magenta (M) and yellow (Y) the color gamut can be expanded in a region with a low brightness.

Further, according to the embodiment, when the printing data is generated, the respective grayscale values of cyan (C), magenta (M), yellow (Y) and black (K) of the dot data item A(x) corresponding to the black dot position 71 (or the process dot position 72) are error-diffused to the grayscale values of cyan (C), magenta (M), yellow (Y), and black (K) of the dot data item A(x+1) corresponding to the process dot position 72 (or the black dot position 71). Therefore, it is possible to form an image close to an image formed based on the image data, while separating the black dot position 71 and the process dot position 72 from each other.

Further, according to the present embodiment, at the time of generating the printing data in the process dot position 72, the grayscale value of black (K) is converted into the grayscale value of the process black formed by cyan (C), magenta (M), and yellow (Y). This allows an easier control.

Additionally, according to the present embodiment, the dot positions are arranged in the dot pattern 70 in a matrix manner so that the black dot positions 71 are arranged adjacent to the top, bottom, left, and right sides of each process dot position 72. That way, the black dot positions 71 are evenly and accurately distributed in the dot pattern 70. Thus, it is possible to accurately express a delicate coloration.

A suitable embodiment of the present invention is thus described. It should however be noted that the embodiment solely serve as an example, and the present invention is not limited to such an example, but rather may be altered in many ways within the scope of the claims provided below. For example, the above embodiment deals with a case where, at the time of generating the printing data by distributing the grayscale values, the respective grayscale values of cyan (C), magenta (M), yellow (Y) and black (K) of the dot data item A(x) for a certain dot position is error-diffused to the grayscale values of cyan (C), magenta (M), yellow (Y) and black (K) of the dot data item A(x+1) for the subsequent dot position. However, the grayscale values may be diffused to the dot data items of all of the adjacent dot positions. Alternatively, the grayscale values may be error-diffused by means of other techniques. Further, it is possible to round off the difference, instead of performing the error-diffusion.

Further, the above embodiment deals with a case where, at the time of generating the printing data for the process dot position 72, the grayscale value of black (K) is converted into the grayscale value of the process black. However, it is also possible not to have the grayscale value of black(k) converted into that of the process black. For example, it is possible to generate the printing data from the image data whose grayscale value of black (K) is dispersed beforehand to the respective grayscale values of cyan (C), magenta (M) and yellow (Y).

Further, the above embodiment deals with a case where the dot pattern 70 corresponds to the entire printing data. However, the dot pattern may correspond to only a part of the printing data. The part of the printing data may correspond to, for example, a part where the grayscale value of black (K) is higher than a predetermined value and is continuous within a predetermined range (e.g. hair of human, shade of an object). In this case, it is preferable that a usual printing be performed with respect to areas outside the dot pattern.

Additionally, the above embodiment deals with a case of using a single dot pattern 70. However, a plurality of dot patterns may be used.

Further, the above embodiment deals with a case where the dot positions in the dot pattern 70 are arranged in a matrix manner, and where the region of the printing data corresponding to the dot pattern 70 is rectangular. However, the region corresponding to the dot pattern may be any given shape.

Additionally, the above embodiment deals with a case where the black dot positions 71 are arranged adjacent to the top, bottom, left, and right sides of each process dot position 72 and are evenly distributed in the dot pattern 70 at a rate of 50%. However, the positional relation of the black dot positions to the process dot positions may be any given positional relation, and the black dot positions may be evenly distributed in the dot pattern at a ratio other than 50%.

Further, the above embodiment deals with a case where the ink-jet printer 101 includes four ink-jet heads 1. However, the ink-jet printer 101 may include ink-jet heads of five or more colors, provided that black (K) ink and ink of a plurality of chromatic colors are used.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An ink-jet recording apparatus which records an image on a recording medium comprising:
   ink-jet heads which eject ink droplets of black and a plurality of chromatic colors onto the recording medium;
   a dot position memory unit which stores therein dot positions;
   an image data memory unit which stores therein an image data item of the image;
   a print data generating unit which generates a print data item based on the image data item stored in the image data memory unit and the dot positions stored in the dot position memory unit; and
   a head controller which causes the ink-jet heads to eject ink droplets to the dot positions, wherein:
   the dot positions include black dot positions at which only ink droplets of black are ejected, and chromatic color dot positions at which only ink droplets of chromatic color ink are ejected, the black positions are evenly distributed in at least a part of the image and each of the black dot positions is distinct from each of the chromatic color dot positions;
   the image data item is stored in the form of dot data items each indicating grayscale values of achromatic and chromatic colors for the dot positions in the image;
   the print data item contains dot data items indicating the grayscale values of the achromatic colors for the black dot positions, and the grayscale values of the chromatic colors for the chromatic color dot positions, wherein the dot data items indicate that the grayscale values of the chromatic colors are at values with which no ink droplet is ejected for the black dot positions and that the grayscale values of the black color are at values with which no ink droplet is ejected for the chromatic color dot positions; and
   the head controller causes the ink-jet heads to eject the ink droplets to the dot positions, so that: only the ink droplets of black are ejected in the black dot positions stored in the dot position memory unit; and only the ink droplets of the chromatic colors are ejected in the chromatic color dot positions stored in the dot position memory unit, a volume of each of the ink droplets respectively corresponds to the grayscale values associated to the dot positions indicated by the print data item generated by the print data generating unit.

2. The apparatus according to claim 1, wherein: the print data generating unit converts a dot data item of the image data item indicating a single dot position into a dot data item of the print data item corresponding to the single dot position, and diffuses an error between the dot data item of the image data item and the dot data item of the print data item to another dot data item corresponding to a dot position adjacent to the single dot position.

3. The apparatus according to claim 1, wherein: for the chromatic color dot positions, the print data generating unit converts a grayscale value of achromatic color indicated by the corresponding one of the dot data items of the image data item into a grayscale value of a process black which substantially equals achromatic color and is formed by ink droplets of the chromatic colors.

4. The apparatus according to claim 1, wherein: the image data item and the print data item each contain the dot data items respectively indicating the dot positions arranged in a matrix manner in a first direction and a second direction perpendicular to the first direction, and the black dot positions are arranged adjacent to the chromatic color dot positions in the first and second directions.

* * * * *